United States Patent Office 3,597,237
Patented Aug. 3, 1971

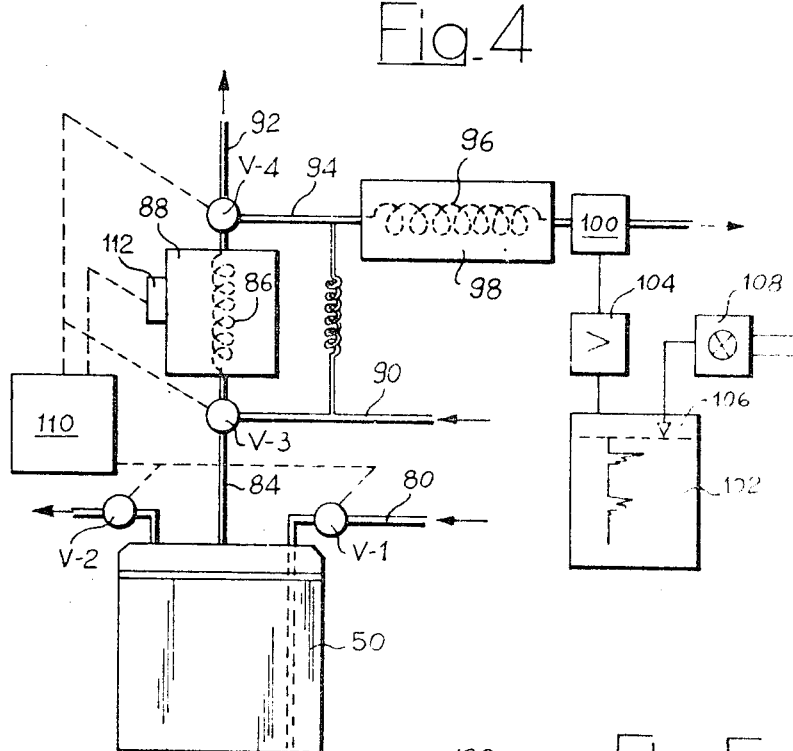
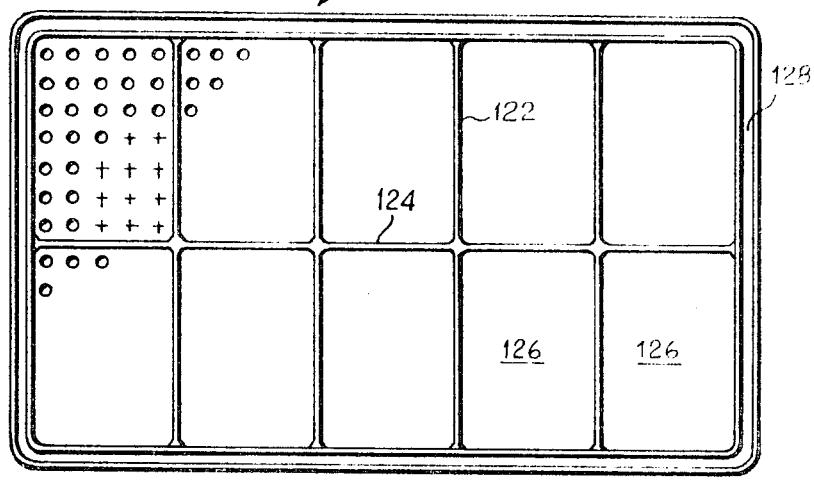

3,597,237
METHOD FOR PACKAGING FOOD PRODUCTS IN FLEXIBLE CONTAINERS
Giovanni Nughes, Monza, Italy, assignor to Star Stabilimento Alimentare S.p.A., Agrate Brianza, Milan, Italy
Filed Jan. 31, 1969, Ser. No. 795,469
Claims priority, application Italy, Oct. 28, 1968, 53,661/68
Int. Cl. B65b 9/02, 31/02
U.S. Cl. 99—171                    7 Claims

ABSTRACT OF THE DISCLOSURE

Method of packaging a foodstuff in a sterilizable container of the envelope-type made of a flexible laminate comprising an inner, heat-sealable polypropylene layer, wherein all sides of the envelope are fluid tight sealed by a twin-bar heat-sealing system, and wherein the closing side of the filled envelope is twin-bar sealed in vacuum by a heat impulse after the side has been clamped flat between its sealing bars in cool condition of the latter. The method also include stitch-sealing the lips of the envelope on its closing side after filling, preparatory to the heat impulse sealing, as well as sterilizing the sealed package and chromatographically testing it for leakage.

---

Figure 1:
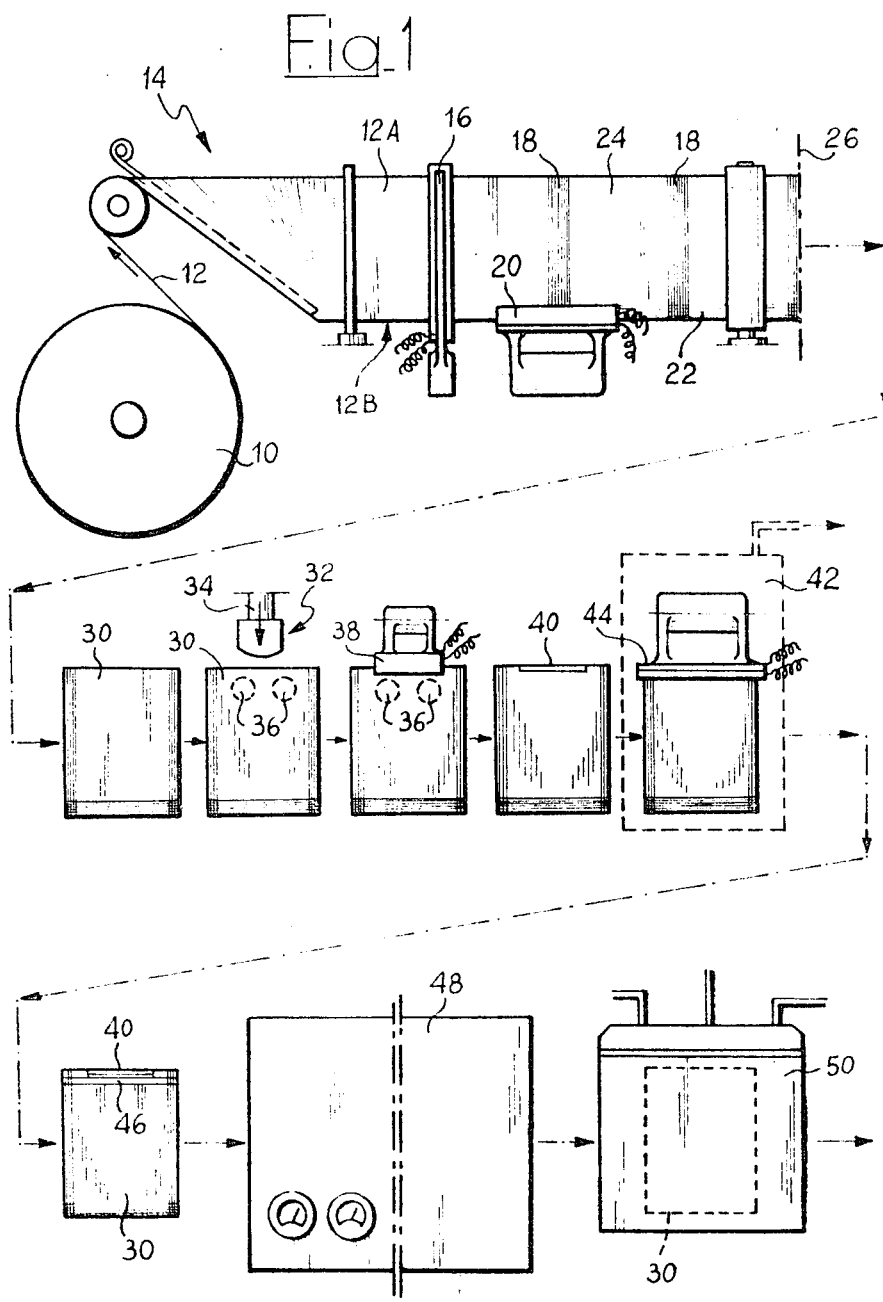

This invention relates to the packaging of food products in flexible containers, in which the product can be packaged in a hermetically sealed condition, thermally sterilized at 100°–125° C. and stored till its use for consumption.

In the past, the method which was most widely, if not uniquely used for preserving over long periods feed products, more particularly proteic products such as meat and meat transformation products, was based on the use of tin-plated cans. However, this method proved and still proves unsatisfactory, the heaviest drawback which is complained of being the "metallic" taste, which is always disagreeable to the consumers, as well as the attack of the tin-plate by the sulfuretted amino-acids of meat, evolving sulfuretted hydrogen and altering the taste of the product.

Attempts have been made at lining the cans on their inside with various varnishes, but no varnishes were found heretofore which, under these specific conditions of use, would be free from porosity and would be satisfactorily bonded to the metal substrate.

Therefore, the food industry has shown a trend towards containers of another kind, more particularly flexible containers of a typical "envelope" form in which the product is hermetically enclosed by heat-sealing. The sheet material employed for manufacturing these envelope containers is a gas-impermeable laminate typically comprising thin layers of synthetic resin and metal, usually aluminum, in various combinations in which, however, the "inside" layer (destined to form the inner surface of the envelope) is made of a heat-sealable thermoplastic resin, advantageously polypropylene.

Examples of such laminates are given hereafter together with their typical uses:

Laminate A

A 68 g./m.$^2$ (75 micron gauge) propylene film is opacized on one face by evaporating aluminum in vacuum, the thus metallized face is bonded to a similar film of polypropylene by employing 10 g./m.$^2$ polyvinylidene chloride as adhesive. This laminate may be advantageously used for small containers for vegetable products and fruit juices.

Laminate B

A 68 g./m.$^2$ polypropylene film is bonded (by employing 10 g./m.$^2$ polyvinylidene cholride) with the aluminized face of a 33 g./m.$^2$ polyethylene terephthalate film "Mylar," 100 gauge. The outside face of this laminate is highly abrasion-proof. The laminate is advantageously employed for containers of medium size and, generally, for liquid products.

Laminate C

The inside layer is a 68 g./m.$^2$ polypropylene film; the intermediate layer is 50 g./m.$^2$ (18 micron) aluminum foil; the outside layer is of "Mylar" (100 gauge). The individual layers are bonded together by employing 4 g./m.$^2$ "Desmacoll" (Bayer), composed of one part by weight "Desmophen 900" (condensate of 3 molecules adipic acid with 4 molecules glycerine) and 2.5 parts "Desmodur R (a solution of triphenylmethane triisocyanate in methylene chloride).

The containers made of this laminate highly withstand outer abrasion and ae substantially gas-proof. The aluminum foil may be printed on its outer face before laminating with the polyester film, which latter protects the printing inks and keeps their colours brilliant. This laminate is typically employed for packaging lump products of small and medium size, such as meat pieces, sausages and the like.

Laminate D

A stronger laminate, suitable for packages to be stored over very long periods comprises a 60 g./m.$^2$ (70 micron) polypropylene film, a 18 g./m.$^2$ polyester film ("Mylar" 50 gauge), a 50 g./m.$^2$ (18 micron) aluminum foil; a 18 g./m.$^2$ polyester ("Mylar," 50 gauge). The films are laminated employing a 4 g./m.$^2$ "Desmacoll."

Laminate E

This is suitable for flexible high-volume containers (1 kg. to 5–10 kg.), for distributing precooked sterilized meals to communities and hotels and for preserving cooked hams. The laminate comprises polypropylene/polyester/aluminum/polyester layers (like laminate D), and is obtained by extruding between the component films the C 30 S Montecatini polypropylene having a high melt-index. This laminate is extremely impact-proof and withstands transport and the weight of the content.

Laminate F

A polyester ("Mylar") film is laminated with polypropylene film by employing a hot-melt adhesive consisting of an epoxy or epoxyphenol resin opacized by means of dyes, pigments, aluminum powder and the like. Two or a plurality of polypropylene films may moreover be employed, alternating with polyester films. The laminate is sterilizable and oxygen-proof.

The object of the invention is to provide a method and an apparatus for packaging foodstuff in flexible containers of the type outlined above. A special object of the invention is to provide an improved method of packaging and final control, such as to minimize the risk of supplying to customers a faulty package.

An ancillary object is therefore to provide a manufacturing line with self-controlled sealing stations for the containers moving along the line. Further objects and advantages will be understood from the appended description.

Figure 2:
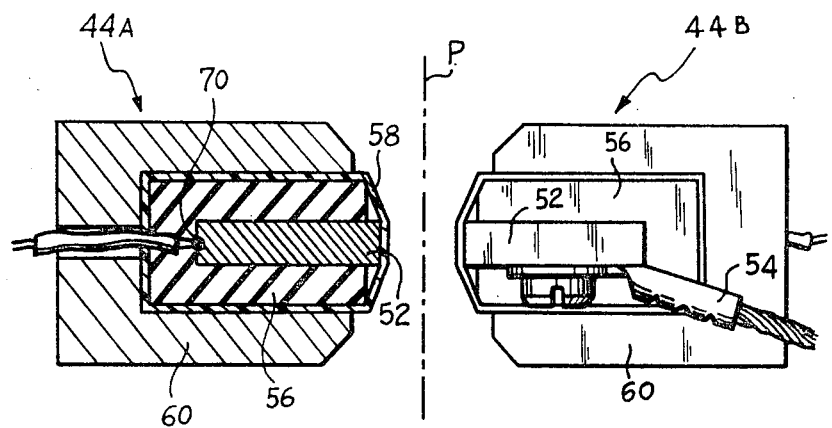
Figure 3:
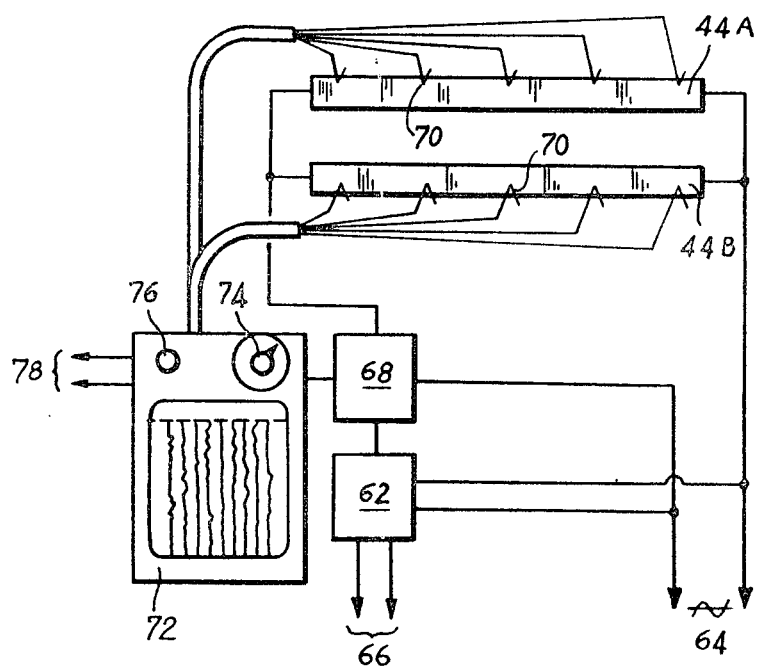

In the accompanying drawings:

FIG. 1 is a graphic representation of the method according to the invention in an embodiment thereof, FIG. 2 is part sectional end view of a pair of heat-sealing bars employed by the apparatus according to the invention, FIG. 3 diagrammatically shows a control arrangement for the bars shown in FIG. 2, FIG. 4 is a diagram of a final testing apparatus, and FIG. 5 is a plan view of an embodiment of a sterilizing tray for the envelopes.

In FIG. 1, numeral 10 denotes a laminate supply roll delivering, for instance, the previously described laminate D in the form of a web 12, which is advanced step by step (by suitable means, not shown) along a manufacturing line comprising, inter alia, a doubling device 14 which folds the web 12 along the longitudinal middle line of the latter, with the propylene layer turned towards the inside. The folded web, indicated by 12A, travels between a pair of "hot" sealing bars (that is, bars which are constantly maintained at a selected sealing temperature, such as 160° C.), denoted by 16 and forming tongs extending transversely of the web. Each time the web 12A stops, the tongs close on the web to produce a transverse seam 18 extending throughout the width of the web 12A. The operative faces of the bars 16 are advantageously longitudinally ruled so that each transverse seam 18 comprises a close plurality of parallel seam lines.

A pair of longitudinal sealing bars 20 are arranged past the transverse bars 16, the bars 20 being likewise of the "hot" type and situated at opposite sides fold line 12B of the web. On each forward step of the web a transverse seam stops at the centre of the tongs formed by the longitudinal bars 20 and the tongs close to produce a longitudinal seam 22 which extends across its respective transverse seam. The length of the longitudinal bars 20 is somewhat greater than the pitch of the transverse seams 18, so that the subsequent longitudinal seams 22 slightly overlap by their ends to form a continuous longitudinal seam, which is likewise preferably of the ruled type as described above. The original web 12 is thereby converted to a chain of upward opening pockets 24. The sealing system employed, as described above, may be defined as "twin-bar sealing system," that is a system in which seam is effected by means of two cooperating bars which supply the sealing heat to both sides of the web 12A (instead of one side only, as in conventional single sealing bar arrangements). In this manner excellent seals of the inner polypropylene layers of the web 12A along the three sides of each pocket 24 are obtained notwithstanding the presence of the aluminum layers in the laminate (which would tend to quickly disperse the supplied heat).

At the line 26, traced as a dash-and-dot line in FIG. 1, a cutter known per se is arranged, which severs the web 12A along the middle line of each transverse seam 18 as the web temporarily stops. The result is a sequence of rectangular envelopes 30 each of which is sealed on three sides and is open at its top side. Conveyors means (not shown) of any suitable type convey the envelopes 30 along the manufacturing line. Numeral 32 denotes a filling station at which the top lips of the envelope are spread apart (typically by means of suction cup members) and the product to be packaged is filled into the envelope by means of a filling head 34, arranged for vertical movement so as to be inserted between the spread out lips of the envelope. Filling is adjusted so as to leave in the envelope a relatively wide free space (more particularly in the case of precooked meals such as gulash and the like), which may represent even about ⅓ of the total capacity of the envelope, for reception of vapours evolved from the product during its subsequent sterilization.

The filling step and its directly following steps are rather critical and delicate. First of all, filling should be effected while avoiding any smearing of the inner surfaces of the outspread lips of the envelope by fat, gravy or the like, so that subsequent sealing of the lips will not be adversely affected. Therefore, during filling, the lips should be well spread out by their respective suction cups by an extent sufficient to enable the filling head to enter the envelope without touching the inner surfaces thereof. Moreover, since the filling head operates intermittently, its shut-off members should be of a type preventing any dripping.

On the other hand, it should be considered that on filling the envelope changes from its substantial planar original configuration to a bulky configuration, by effect of which the lips of the envelope take a more or less undulated or twisted form which critically affects the success of the final sealing step.

Therefore, according to an advantageous feature of this invention, as soon as the filling head has been withdrawn upwardly from the envelope, the suction cup 36 (or other equivalent members) re-close the lips of the envelope and the thus closed lips are provisionally stitched by means of a pair of "hot" sealing bars. Preferably, this pair of bars effect a continuous seam line 40, which extends over a middle portion of the top edge of the envelope without joining the two lateral seams, so as to leave a free passage adjacent each of the lateral seams.

The envelope prepared as above, is conveyed to a vacuum chamber 42 having a pair of sealing bars 44 arranged therein, which operate by "heat pulse" and the operation of which shall be described hereafter. By applying vacuum to the chamber 42, the gases in the envelope are evacuated and the bars 44 immediately effect the final sealing, the final seam being denoted by 46 in FIG. 1.

The thus sealed envelopes are sterilized in an autoclave 48 which may be of any suitable type, provided it operates under pressure. In fact, according to a feature of the invention, it is important and eventually even essential for the sterilization to be carried out by applying to the envelopes an adequate counterpressure which holds them flat notwithstanding the vapour pressure set up within each envelope at the sterilizing temperature. For instance, if the sterilizing temperature amounts to 120° C., to which there corresponds an absolute water vapour pressure of 2 kg./sq. cm., the counterpressure in the autoclave 48 should preferably amount to about 2.1 kg./sq. cm. throughout the treatment period including the cooling period of the envelopes with their contents. It is moreover important for the envelopes not to be arranged at random during sterilization, as each envelope should be uniformly exposed to the conditions prevailing in the autoclave. To this end, special foraminated trays are advantageously employed, of the type to be described hereafter with reference to FIG. 5.

After sterilization, the tightness of the envelopes is checked at a gas-chromatographic check section comprising a jar 50, to be described hereafter with reference to FIG. 4. The packages which do not satisfactorily meet the gas-chromatographic check are discarded, the sound packages being conveyed to storage or cartoning which, however, is beyond the scope of the invention.

In FIG. 2, the "heat pulse" bars previously generally denoted by 44 in FIG. 1, are denoted by 44A, 44B, respectively, the bar 44A being shown in a cross sectional view. The bars face towards each other on either side of the plane P in which the envelopes to be sealed travel, the direction of travel obviously being perpendicular to the plane of the figure. The bars each comprise an electric resistor of the flat band type 52, provided at its opposite ends with the heating current leads 54. The resistors 52 are each arcommodated by a channel member 56 of silicone rubber, a longitudinal edge region of the resistor uniformly protruding by a small extent to the outside from the open side of the member 56. The metal strip-rubber unit is enclosed by a thin fluorocarbon resin sheath (particularly of polytetrafluoroethylene) and is encased in a rigid supporting body 60, such as of pig-iron, of C-shaped cross section.

As mentioned hereinbefore, the heat sealing bars 44A, 44B operate by heat pulses. More particularly, when an envelope is between the bars, the bars are substantially cool and pinch under these conditions the top edge of the envelope somewhat below the "stitch" 40. As a result the region at which the final seal 46 is carried out, is preliminarily flattened between the bars and the strip resistors 52 are thereafter energized for a time period sufficient to provide the necessary sealing temperature. On completion of sealing the bars are kept clamped till the sealing zone has substantially cooled down.

The bars 44,A 44B are controlled by the circuit shown in FIG. 3. In this figure, 62 indicates a timer which is connected to the supply network 64 and, on the other hand, by leads 66, to an electromagnetically actuated bar clamping device. The timer 62 is adjustable to automatically timely close and open the bars.

The timer 62 has operatively associated therewith a further timer 68 which is likewise adjustable and is arranged to connect the resistors 52 of the bars to the network 64 during the period necessary for sealing. The timer 68 is subordinated to the timer 62, so that the steps of closing the bars, starting heating, stopping heating and opening the bars take place in the proper sequence at the desired time intervals.

An important aspect of the invention resides in the fact that the distribution of temperature over the length of each bar 44A, 44B is sensed by a plurality of thermocouples 70 fitted to the back of the respective strip resistors 52 (compare also FIG. 2) and connected to a central control apparatus 72 (FIG. 3). This apparatus comprises a sealing temperature setting member 74 and an alarm member 76 which may be a bell and/or a warning lamp, in an arrangement whereby the operator is forthwith warned as soon as any of the thermocouples 70 detects an inadmissible deviation in temperature at its respective bar region with respect to the temperature which has been set. Preferably, the apparatus 72 is connected by leads 78 to a general switch which stops the whole packaging process whenever such deviation occurs.

The apparatus 72 preferably includes a modulating unit (known per se) for the bar heating current in association with the heating timer 68 in order to control ("modulate") the heating current depending upon the temperature detected by the thermocouples, so that the strip resistors 52 are maintained at a constant temperature (such as 155° C.) from the moment at which this temperature has been actually reached to the moment at which the heating current is cut off by the timer 68.

Reverting now to FIG. 4, numeral 50 still denotes the jar shown in FIG. 1, within which the package to be tested (or a number of such packages) is placed. The jar has a fluid-tight closure and is provided with:

A conduit 80 supplying a scavenging gas, with its respective valve V-1;

A drain conduit 82 with its respective valve V-2;

A suction conduit 84 opening into a three-way valve V-3.

The valve V-3 is connected with a collecting column 86 arranged in a thermostat 88 and opening into a three-way valve V-4. A conduit 90 supplying a carrier gas further opens into the valve V-4, whereas a conduit 92 leads from the valve V-4 to a source of vacuum and a conduit 94 connects said valve with the analytic column 96 arranged in a thermostat 98 in accordance with the known principles of gas-chromatography. The analytic column 96 connects with a detector 100, the electric output of which is connected with a recording unit 102 through an amplifier 104. The recording unit comprises a limit-contact 106 connected to a signaling apparatus 108. The valves V-1, V-2, V-3, V-4 are operated by a central control apparatus 110 which further controls a thermal unit 112 on the thermostat 88.

In operation, assuming a package has been placed in the jar 50, the central control apparatus 110 opens the valves V-1 and V-2 to flush the inside of the bell by means of the scavenging gas, the thermostat 88 being in its "cold" condition. Subsequently, the valves V-1, V-2 are closed and the valves V-3 and V-4 are switched to connect the jar to the source of vacuum through the conduit 92. Under these conditions, if the package contained in the bell suffers from a leakage or "microleakage," the vacuum applied causes the vapours of the product to escape through the leak, the freed vapours being condensed in the collecting column 86. The central apparatus 110 now switches the valves V-3 and V-4 to establish the path 90–86–94 and switches on the unit 112 for heating the thermostat 88. The condensed vapours re-evaporate and are carried by the carrier gas through the analytic column 96 and detector 100, the latter detecting the microleakage and signaling it to the apparatus 102 which is caused to perform an anomalous (excess) stroke of the recording instrument. This circumstance is ascertained by the limit contact 106 which switches on the warning apparatus 108. The warning apparatus 108 may, if desired, electrically energize a device associated with the manufacturing line which discards from the line the faulty package detected by the gas-chromatographic arrangement shown. In any case, after the test of a package, the central control apparatus 110 returns the arrangement to its starting conditions for testing the next incoming package.

FIG. 5 shows a tray 120 for sterilizing the packages in the autoclave 48 shown in FIG. 1. The tray has a foraminated bottom and a system of partitions 122, 124 extending in mutually perpendicular directions, which jointly define a plurality of compartments 126 into each of which one package is placed in horizontal position. The edge 128 of the tray is shaped according to concepts known per se to permit stacking of the trays. The autoclave 48 is then charged with stacks of trays like the one shown on the drawing. The individual packages are thus kept separated from one another and uniformly exposed to the conditions prevailing in the autoclave.

It will be understood that the invention as described above may be carried out in practice by adopting various arrangements of the stations. The preferred arrangement appears to be the one in which all stations are aligned on a single machine, but for the autoclave 48 and the gas-chromatographic test arrangement. However, even within the arrangement of this machine, paths such as of circular shape may be interposed, such as by means of revolving carriers, should this be convenient for reasons of design.

What I claim is:

1. A method of packaging a foodstuff in a sterilizable container formed of a flexible impermeable resin-metal laminate including an inner, heat-sealable layer of synthetic thermoplastic resin comprising the steps of:
    (a) heat sealing with at least one pair of constant temperature sealing bars one section of thermoplastic laminate to another section of thermoplastic laminate to provide a container with an open top;
    (b) separting by suction means the two sections of the container sufficiently apart to permit the inroduction of a filling head wihout contacting the side sections;
    (c) filling the container with the foodstuff from the filling head;
    (d) heat sealing the two sections along a portion of their open top edge to partially close the container but still permit open access from the interior of the container to the surrounding atmosphere;
    (e) applying vacuum to the container to evacuate gases from the container through the open portion of the top edge;

(f) applying a pair of variable temperature sealing bars during the application of vacuum to the top edge of the container, the variable temperature sealing bars initially being at a temperature below the sealing temperature of the thermoplastic laminate sections and accordingly the entire top edge of the container being initially closed by pressure alone;

(g) subsequently heating the top edge by heat from both variable temperature sealing bars until a thermal seal is provided along the top edge to effectively seal the container;

(h) sterilizing the foodstuffs by heating in an autoclave having a pressure surrounding the container greater than the vapor pressure generated by heating the foodstuffs;

(i) applying a pressure in a fluid tight closure to the outside of the container lower than the vapor pressure in the container;

(j) applying a carrier gas to the closure; and (k) analyzing the carrier gas by gas-chromatography means to determine if the container is leakproof.

2. A method of packaging a foodstuff in a sterilizable container formed of a flexible impermeable resin-metal laminate including an inner, heat-sealable layer of synthetic thermoplastic resin comprising the steps of:

(a) sealing one section of thermoplastic laminate to another section of thermoplastic laminate to provide a container with an open top;

(b) separating the two sections of the container sufficiently apart to permit the introduction of a filling head;

(c) filling the container with the foodstuff from the filling head;

(d) joining the two sections along a portion of their open top edges to partially closes the container but still permit open access from the interior of the container to the exterior of the container;

(e) applying vacuum to the container to evacuate gases from the container through the open portion of the top edge;

(f) applying heat sealing and pressure means during the application of vacuum to the top edge of the container, the heat sealing and pressure means initially being at a temperature below the sealing temperature of the thermoplastic laminate sections and accordingly the entire top edge of the container being initially closed by pressure alone; and (g) subsequently heating the top edge by the heat sealing and pressure means until a thermal seal is provided along the top edge to effectively seal the container.

3. The method of claim 2 wherein the two sections of the container are separated sufficiently apart to permit the introduction of the filling head and foodstuff without physically contacting the top edge of the container and the two sections are partially closed along only a central section permitting ready open access from the interior of the container to the exterior of the container along both sides of the closed top portion.

4. The method of claim 2 further comprising the steps of heat-sterilizing the sealed package while uniformly applying thereto an external counterpressure exceeding the vapor pressure of the contents of the package at the sterilizing temperature and maintaining said counterpressure until the sterilized package has cooled.

5. The method of claim 4 further comprising the steps of testing the sterilized container for leakage by placing the container in a closure; evacuating the atmosphere from the closure through a vapor-collecting column to collect in the column any vapors leaking from the package; subsequently passing through the column a carrier gas and gas-chromatographically analyzing the contents of the carrier gas leaving the column to thereby produce a signal indicating a defective package should one exist.

6. The method of claim 5 wherein the two sections of the container are separated by suction means.

7. The method of claim 5 wherein the sealing of one section of thermoplastic laminate to another section of thermoplastic laminate to from the container is performed by heating with a least one pair of constant temperature sealing bars.

References Cited

UNITED STATES PATENTS

| | | | |
|---|---|---|---|
| 2,953,877 | 9/1960 | Chapman et al. | 53—22 |
| 3,108,881 | 10/1963 | Shaw et al. | 99—171 |
| 3,216,172 | 11/1965 | Piazze | 53—22 |
| 3,230,687 | 1/1966 | Nutting et al. | 53—28X |
| 3,261,140 | 7/1966 | Long et al. | 53—22 |
| 3,438,259 | 4/1969 | Bossert, Jr. | 73—49.3 |
| 3,459,036 | 8/1969 | Powell | 73—40.7 |
| 3,465,489 | 9/1969 | Monaghan | 53—28 |
| 3,481,688 | 12/1969 | Craig et al. | 99—214X |
| 3,481,691 | 12/1969 | Trainham | 99—214X |

FRANK W. LUTTER, Primary Examiner

W. L. MENTLIK, Assistant Examiner

U.S. Cl. X.R.

53—22, 28, 39